(12) United States Patent
Thomas

(10) Patent No.: US 6,833,932 B1
(45) Date of Patent: Dec. 21, 2004

(54) METHOD FOR ELIMINATION OF SPATIAL ARTIFACTS IN DIGITAL IMAGING

(75) Inventor: John C. Thomas, Portland, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/540,600

(22) Filed: Mar. 31, 2000

(51) Int. Cl.[7] .............................................. G06K 15/00
(52) U.S. Cl. .................... 358/3.06; 358/3.07; 358/3.13; 358/3.16; 358/3.26; 345/596
(58) Field of Search ............................. 358/3.06, 3.07, 358/3.13, 3.16, 3.19, 3.26; 345/596, 599; 382/275, 270

(56) References Cited

U.S. PATENT DOCUMENTS

| | | | |
|---|---|---|---|
| 5,379,118 A | 1/1995 | Steinhardt et al. | |
| 5,463,720 A | * 10/1995 | Granger | 358/1.9 |
| 5,557,709 A | 9/1996 | Shu | |
| 5,740,334 A | 4/1998 | Lin et al. | |
| 6,597,813 B1 | * 7/2003 | Stanich et al. | 358/3.16 |

OTHER PUBLICATIONS

Aperiodic Tiles, Discrete & Computational Geometry 8:1–25 (1992), pp. 1–25 by Robert Ammann, et al.

* cited by examiner

Primary Examiner—Scott A. Rogers
(74) Attorney, Agent, or Firm—Marger Johnson & McCollom, P.C.

(57) ABSTRACT

A method and system for elimination of spatial artifacts in digital imaging. Aperiodicity is applied to periodic data to mitigate spatial artifacts. The data can be received aperiodically and reformatted to be rendered by a periodic output device. The data can be received in periodic format and rendered on an aperiodic output device. The system has aperiodic input and output devices.

19 Claims, 3 Drawing Sheets

METHOD FOR ELIMINATION OF SPATIAL ARTIFACTS IN DIGITAL IMAGING

BACKGROUND OF THE INVENTION

1. Field of the Invention

This invention relates to methods for eliminating spatial artifacts in digital imaging, more particularly to a method for applying an aperiodic, halftone, tiling scheme to digital images.

2. Background of the Invention

Digital images are typically reproduced using a grid of elements, such as in dots or picture elements (pixels). Due to the periodic nature of these grids, spatial artifacts can occur in the resulting image. For example, images such as those in digital printing may have an artifact referred to as Moiré patterns.

These patterns are formed when two periodic and nearly identical spatial frequencies interfere, much like the interference patterns caused by two disturbances in a body of water. In some areas the 'ripples' sum together, in others they subtract. When these sum and difference artifacts appear in spatial frequencies perceptible to the human eye, they are perceived and detract from the image quality. In displayed or printed images, these patterns may occur because of the sampling frequency of the input device beats against the halftone frequency of the original image.

Several different approaches have been used to overcome this problem. One approach is to apply a random noise pattern to the pixels of the image to break up the interference patterns. The random noise pattern is often generated using blue noise. One example of such an approach is shown in U.S. Pat. No. 5,557,709, issued Sep. 17, 1996.

Other approaches process the colors of a printed image to render one color in a non-periodic fashion. This serves to break up the interference patterns. An example of such an approach is shown in U.S. Pat. No. 5,740,334, issued Apr. 14, 1998.

The use of quasiperiodic tools is also shown by U.S. Pat. No. 5,379,118, issued Jan. 3, 1995. In this approach, the frequencies of the appearance of the elements of a picture are manipulated. The pattern is quasiperiodic in this application, however, as the pattern does achieve symmetry after a number of elements are produced.

One unique aperiodic but non-random pattern is Ammann tiles, named after Robert Ammann, one of the discoverers of these tiles. These tiles and other aperiodic tiling schemes have base tiles, or proto-tiles, that are then used to build larger tiles that have the same aperiodic properties of the base tiles. Aperiodic as used in this disclosure refers to non-periodic but non-random patterns, unlike those discussed above. No use of these types of patterns has been made in digital imaging applications, even though their aperiodicity would be useful in these applications. The applications of non-periodic patterns in the above approaches manipulate the sampling and pixel frequencies pixel by pixel not on an image basis. Applying aperiodicities at the image level has certain advantages.

Therefore, a method and structure applying aperiodic tiles to digital images is needed.

SUMMARY OF THE INVENTION

One aspect of the invention is a method for applying aperiodicity to image data to mitigate spatial artifacts. The method comprises the steps of receiving image data in a periodic format and converting it to an aperiodic format. Alternatively, the method comprises the steps of receiving data in an aperiodic format and converting it to a periodic format. One example of an aperiodicity that can be used for formatting the data is Ammann tiling.

Another aspect of the invention is a system that has an aperiodic input device and an aperiodic output device. The input device produces aperiodic image data and passes it to the aperiodic output device for rendering.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Moiré patterns, as mentioned above, are undesirable image artifacts caused by the periodicity of the pixel grids used in most digital imaging applications. Attempts have been made to disturb or disrupt the interference patterns. However, at best this type of artifact is only mitigated but not eliminated.

One object of this invention is to eliminate this type of artifact by applying an aperiodicity to the image data. An example of an aperiodicity can be found in what are referred to as Ammann tiles, as discussed in Ammann, et al. "Aperiodic Tiles," *Journal of Discrete and Computational Geometry*, 8:1–25 (1992).

Figure 1:
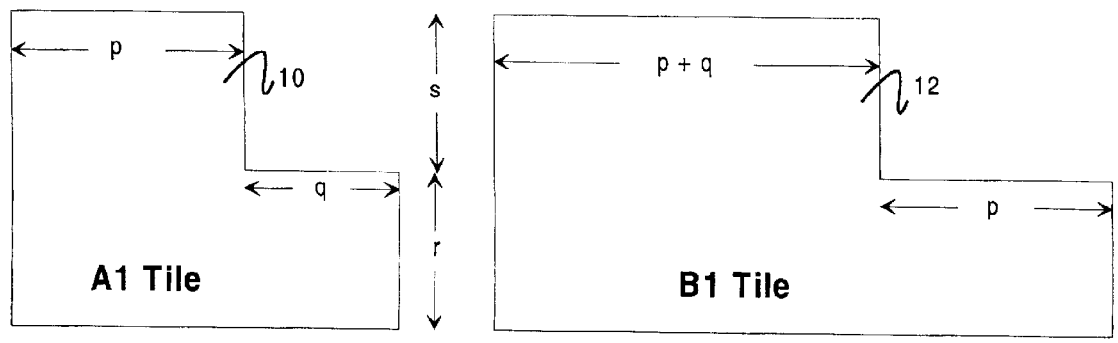
FIG. 1 shows examples of two aperiodic base tiles in accordance with the invention.

This article sets out the characteristics of these tiles. An example of one set of the base tiles is shown in FIG. 1. The dimensions of the A1 tile 10 is p+q wide, and s+r high. There is an indentation that is q wide and s high, as measured from the top of the tile. The B1 tile 12 has the dimensions of 2p+q wide and s+r high. There is an indentation that is p wide and s high, as measured from the top of the tile.

In order to be classified as aperiodic, and therefore as Ammann tiles, these dimensions must relate to each other in a specific manner. They must meet the requirement of:

$$\frac{p}{q} = \frac{r}{s} = \frac{1+\sqrt{5}}{2}.$$

These tiles also have the unique characteristic that they can be combined to create larger congruent compound or super tiles that meet the same dimension requirements.

Figure 2:
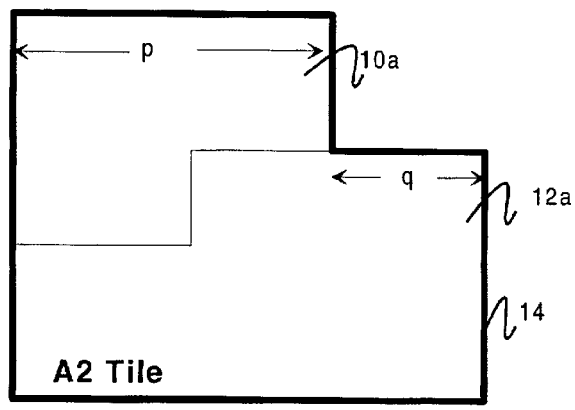
FIG. 2 shows examples of two aperiodic composite tiles in accordance with the invention.
Figure 2:
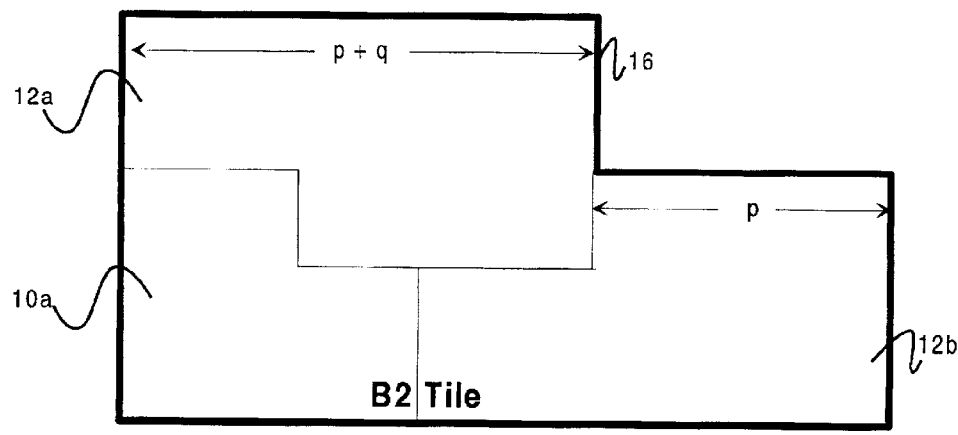
Figure 3:
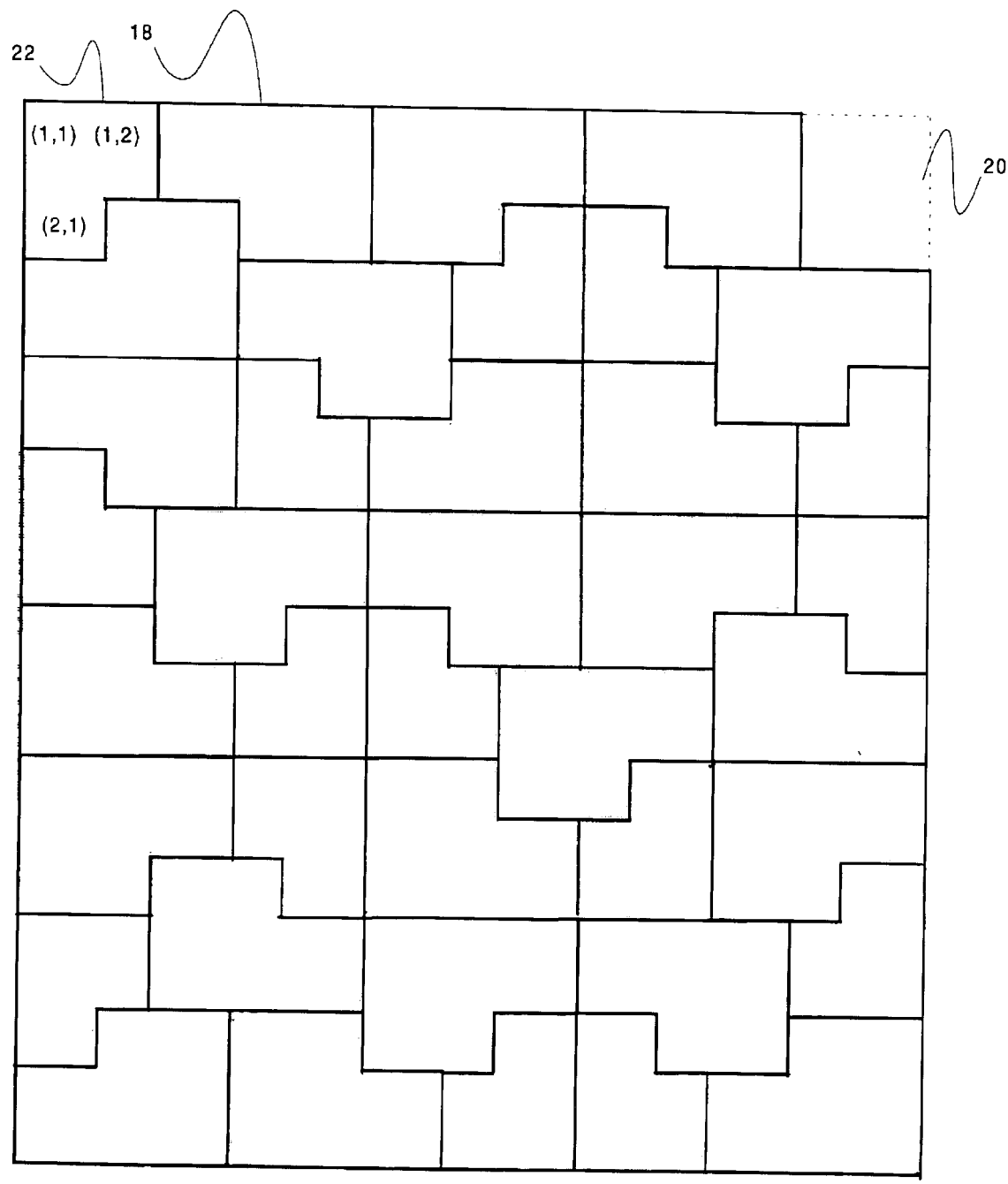
FIG. 3 shows one example of aperiodic tiles applied on an image-wide basis, in accordance with the invention.

As can been seen in FIG. 2, an A2 tile 14, shown by the heavier outline, is a composition of one A1 tile 10a and one B1 tile 12a. B2 tile 16, again shown by the heavier outline, is a composition of one A1 tile 10a and two B1 tiles, 12a and 12b. It should be noted that the ps and qs of the two images are not of the same actual lengths. They are instead proportions to indicate that the tiles meet the above criteria. This type of composition of these tiles can be performed until an entire image area is substantially covered by the aperiodic tiles. An example of these tiles in a high level super tile is shown in FIG. 3. As can be seen by the region 20, which is where the tiles do not cover the entire image area, these tiles are aperiodic. When assembled correctly they do not result in larger periodic super tiles.

Other types of aperiodic tile patterns exist. This Ammann tiling scheme is just one example of these types of non-periodic but non-random tiling schemes. Further, several Ammann tiling schemes exist and this is just one example of an Ammann tiling scheme.

Application of these aperiodic tiles can be done in many ways. For purposes of this discussion, several different situations will be used as examples. In the first example, the actual output device is aperiodic. For video or still images displayed on a device such as an LCD display or other type of display device, the electrodes on the glass would be patterned as these aperiodic tiles. For hard copy devices, such as digital printers, the raster image processor (RIP) will handle and render the data aperiodically. Both the displaying and printing of images will be referred to here as rendering the image.

With an aperiodic output device, the input data could be in either aperiodic or periodic format. If the input data were already in a compatible aperiodic format, the RIP or the video controller of the output device would just render it. If the input aperiodicity were of a different characteristic from the output aperiodicity, the data would have to be reformatted into the output aperiodicity. This situation is similar to the reformatting of aperiodic input data to periodic output data, or the reverse, as discussed in more detail below.

If the input data were in periodic format, it would need to be sampled into aperiodic format. As used in the discussion of this invention, periodic format is any format that assumes a periodic grid or Cartesian layout. Similarly, although the term normally used to describe reformatting digital data of one format into digital data of another format is 're-sampling' the term 'sampling' will be used. Sampling as defined here will include both re-sampling of digital data and original sampling of analog data. Whether the data is analog or digital does not matter in the application of this invention.

Periodic output formats include such formats as VGA, SVGA, etc., for display devices and Postscript™ or other print description languages (PDL) for hard copy applications. In addition, the term sampling refers to the processing of the data to convert it to either aperiodic or periodic format.

Figure 4:
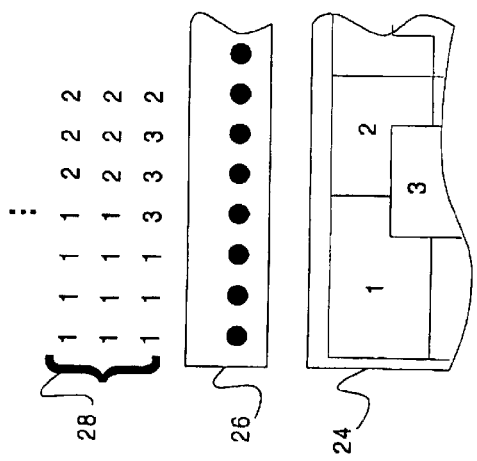
FIG. 4 shows one embodiment of an aperiodic input device operable to produce aperiodic image data, in accordance with the invention.

One method to achieve aperiodic input data is to use an aperiodic input device. For example, the array of scanning elements used in a scanner could operate in an aperiodic fashion. An example of one such scanning bar is shown in FIG. 4. A scanning bar 26 scans an image 24. The resulting assignment of the incoming data from the bar is formatted according to an aperiodic scheme.

As can be seen from the pattern of incoming data, the first line of scanning data shows that pixel one has data from the leftmost four elements of the input array. The third line of scanning data shows that pixel one only has data from the leftmost two elements of the input array. In this manner, the elements receive data that is immediately placed into aperiodic format. With the ability of a system to convert from aperiodic to periodic as necessary, this aperiodic input device could be used with any output device.

If the output device is compatibly aperiodic as well, the data does not have to be converted as in the case of periodic formatted data. However, this invention is applicable to periodic input and aperiodic output devices as well.

To convert periodic formatted data to aperiodic format, for example, a processor could use a super-cell approach. In this example, the incoming data may have a given resolution, such as 640 pixels by 480 rows. The data could be converted into aperiodic format by taking pixels 1 and 2 in row 1 and pixel 1 in row 2 and averaging them together to arrive at a digital image value. This value would then become the value for the aperiodic imaging element shown by tile 22. Again, this is for an aperiodic output device. A more accurate method would be to allocate proportional image data from overlapping regions of adjacent elements.

A second situation is where the output device is periodic. That is, the output device renders images in a Cartesian or grid of pixels, such as a video display or a typical printer with a given dots per inch. If the data is aperiodic, the processor or controller would have to map the aperiodic data onto the periodic array by what is defined here as a sampling process. This process may involve an interpolation process through which the pixels to be turned on in the periodic array are determined by a weighting of the pixels formed into one tile of the aperiodic format.

If the incoming data is periodic in format and must be rendered on a periodic array, it may be sampled twice. In a first sampling, the data will be sampled from the periodic format into aperiodic format, and then resampled into the necessary periodic format for rendering. This last step may use the interpolation process described above.

Figure 5B:
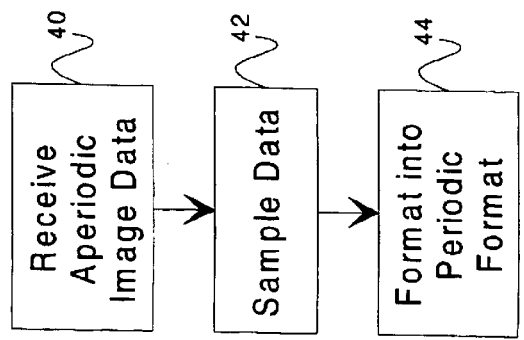
FIGS. 5a and 5b show processes for converting between aperiodically formatted data and periodically formatted data in accordance with the invention.
Figure 5A:
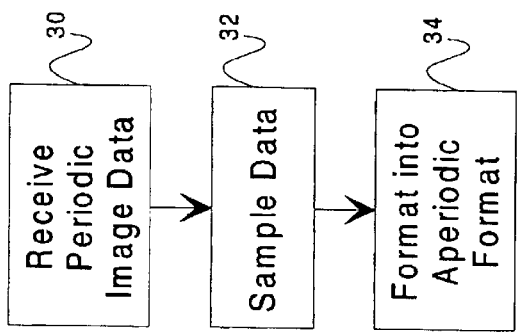

These conversion processes from aperiodic to periodic and periodic to aperiodic are shown in FIGS. 5a and 5b. In FIG. 5a, the incoming data received at step 30 is periodic format, as defined above. The data then undergoes the sampling process described above at step 32. The now aperiodic data is then stored in step 34.

The converse of this process is shown in FIG. 5b. In this example, the incoming data at step 40 is aperiodic. The aperiodic data is then processed through the sampling referred to above at step 42. The data is then stored as periodic in step 44.

In this invention, it is possible that there will be a loss of resolution, depending upon the specific sampling technique used to reformat the data. However, it is believed that as bandwidth restrictions ease with higher speed processors, the data can be received at a higher resolution than that to be displayed. This will allow the application of the aperiodicity to be transparent to the end viewer of the images.

Figure 6:
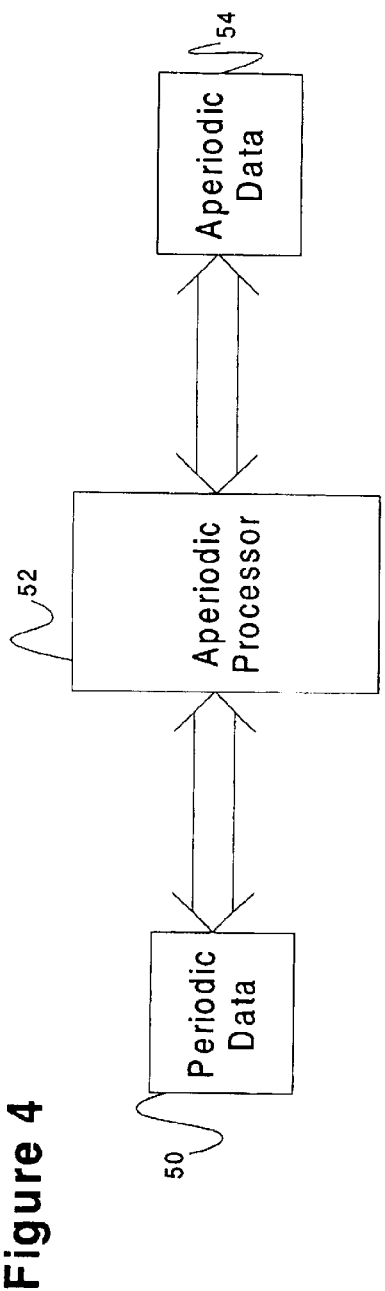
FIG. 6 shows one embodiment of a system capable of managing data in either aperiodic or periodic formats.

An example of a structure to handle the formatting conversions is shown in FIG. 6. The aperiodic processor 52 can receive either periodic data 50 or aperiodic data 54 and convert it into the other format. As defined here, processor includes the possibility of a lookup table. The lookup table, as an example, would have the tile position, type and orientation and allow reference of them by their equivalent Cartesian grid position. Alternatively, this information could be derived on the fly by an arithmetic processor or central processing unit (CPU) relying upon the decomposition information of a base tile from the parent or super tile.

This structure could be viewed as the RIP of a printing system. The RIP of the printing system would just have to be reprogrammed with the necessary commands to allow handling of aperiodic data. This structure could also be viewed as the graphics or video controller of a display apparatus. Alternatively, it could be a separate structure that performs these functions. This separate structure could even be substituted in the front-end of a display device for the analog to digital converter. This would allow display data to be initially sampled aperiodically as it enters the display device, such as an analog broadcast signal entering a television receiver.

If the functionality of an aperiodic processor were implemented into part of the system CPU, the result would be far more flexible. In a preferred embodiment, for example, there is an aperiodic input device and an aperiodic output device. The aperiodicity applied would be Ammann tiling. In this instance, it the aperiodic processor were implemented inside of the system processor, the system processor would recognize the two input/output devices as both being periodic and would just pass the data through without converting it from one format to another and then back again.

In summary, the invention applies aperiodic tiling to image data to avoid artifacts in images. One such artifact is Moiré. Other artifacts such as rosettes, image compression or scaling artifacts, and double-dithering artifacts could be mitigated by this invention.

Thus, although there has been described to this point a particular embodiment for a method and structure for applying aperiodic tiling to image data, it is not intended that such specific references be considered as limitations its upon the scope of this invention except in-so-far as set forth in the following claims.

What is claimed is:

1. A method of manipulating image data, comprising the steps of:
   receiving the image data at a processor, wherein the image data is in an aperiodic cell format;
   sampling the image data into a predetermined periodic format.

2. The method as claimed in claim 1 wherein the aperiodic cell format is Ammann tiles.

3. The method of claim 1 wherein the predetermined periodic format is that used for a printer description language.

4. The method of claim 1 wherein the predetermined periodic format is:
   Postscript™.

5. The method of claim 1 wherein the predetermined periodic format is SVGA.

6. The method of claim 1 wherein the predetermined periodic format is XGA.

7. The method of claim 1 wherein the predetermined periodic format is VGA.

8. The method of claim 1 wherein the predetermined periodic format is SXGA.

9. The method of claim 1 wherein the input device is a scanner.

10. The method of claim 1 wherein the input device is a camera.

11. The method of claim 1 wherein the output device is a printer.

12. The method of claim 1 wherein the output device is a display.

13. A method of manipulating image data, comprising the steps of:
    receiving the image data at a processor, wherein the image data is in a periodic cell format;
    sampling the image data into a non-random, aperiodic cell format using Ammann tiling.

14. The method of claim 13 wherein the periodic cell format is VGA.

15. The method of claim 13 wherein the periodic cell format is SVGA.

16. The method of claim 13 wherein the periodic cell format is XGA.

17. The method of claim 13 wherein the periodic cell format is SXGA.

18. The method of claim 13 wherein the periodic cell format is used for a printer description language.

19. An imaging system, comprising:
    an aperiodic input device, wherein the input device produces image data in aperiodic format;
    an aperiodic output device wherein the output device renders an image represented by the image data produced by the input device aperiodically.

* * * * *